No. 774,514. PATENTED NOV. 8, 1904.
J. GEDEON & J. F. PROSSER.
TIDE AND DRAFT INDICATOR.
APPLICATION FILED MAR. 10, 1904.
NO MODEL.
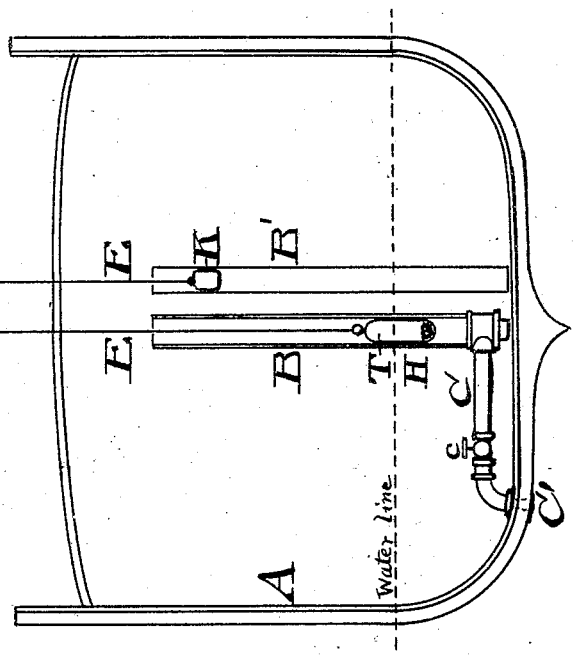
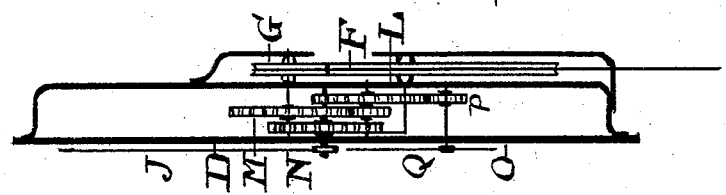
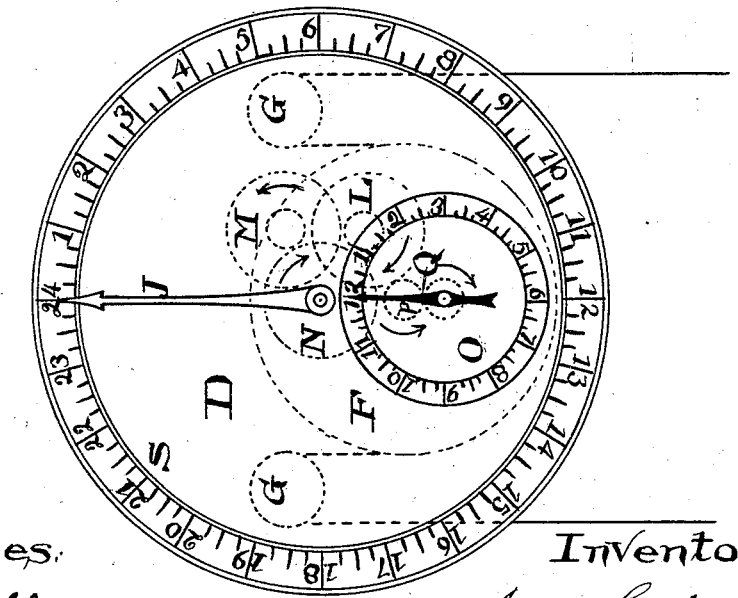
Witnesses.
E. A. Tibbitts
Chas H Errman
Inventors:
James Gedeon.
Joseph F. Prosser.
per Geo. W. Tibbitts, Attorney.

No. 774,514.

Patented November 8, 1904.

UNITED STATES PATENT OFFICE.

JAMES GEDEON AND JOSEPH F. PROSSER, OF CLEVELAND, OHIO, ASSIGNORS OF ONE-THIRD TO CHARLES HERMAN, OF CLEVELAND, OHIO.

TIDE AND DRAFT INDICATOR.

SPECIFICATION forming part of Letters Patent No. 774,514, dated November 8, 1904.

Application filed March 10, 1904. Serial No. 197,419. (No model.)

*To all whom it may concern:*

Be it known that we, JAMES GEDEON and JOSEPH F. PROSSER, citizens of the United States of America, and residents of Cleveland, county of Cuyahoga, and State of Ohio, have invented certain new and useful Improvements in Tide and Draft Indicators, of which the following is a specification.

This invention relates to tide and draft indicators for sailing vessels or steamships, and has for its object to provide a simple and ready means for indicating the draft or depth of water a vessel is drawing, to be located in the pilot-house or other suitable locality, whereby the officers of the vessel may at all times quickly ascertain such draft and enable them to load their vessels to their full capacity and at the same time avoid shoals or rocks in or near their pathway.

The invention consists in the constructions and combination of elements for such purposes, substantially as hereinafter described, and pointed out in the claims.

In the accompanying drawings, Figure 1 is a face view of the indicator, showing the graduated dials. Fig. 2 is a vertical section of the same. Fig. 3 is a vertical cross-section of a vessel, showing the adaptation of the indicator to the vessel and the means for operating the same.

A represents the hull of a vessel, which may be of any of the well-known constructions.

B B' are two vertical pipes standing up from the keelson to a considerable distance above the water-line and open at the top. Pipe B is connected at the bottom to a branch pipe C, which is open out through the bottom of the vessel with the sea at C', and in which is provided a stop-cock c.

D is a dial having a back framework in which is a gear mechanism similar to clockwork. This mechanism is supported in a suitable place over the said pipes B B'.

E is a cord or cable playing under a large sheave F and over two small sheaves G G in the dial mechanism. To the ends of said cord or cable, which hang suspended on the said pipes B B', are attached in pipe B a float H, and in pipe B' a counterbalance-weight K. By means of the float and the cord the said dial mechanism is operated by the rise and fall of the vessel in the water.

On the dial is made a graduated scale S at its circumference, divided into twenty-four parts, which represent feet and fractions of feet, which is designed to indicate the depth the vessel is in the water. A pointer J on the dial D is actuated by a pinion $p$, operating a train of gears L M N to move said pointer to mark off on the scale S the number of feet the vessel settles in the water. A small dial O has a scale divided into twelve parts and fractions representing inches and fractions. This dial is designed to indicate the fractions of an inch. The small pointer makes one complete revolution to each of the numbers on the large dial.

The float H is of peculiar construction to adapt it for the use and is designed to avoid soaking and disintegration by water. It consists of a small glass tube T, closed at the ends, contains compressed air and a small quantity of mercury, thus insuring at all times and stages to maintain its position relative with the water-level. The cord or cable is made of copper wires braided together and is capable of resisting corrosion and stretching.

Having described our invention, what we claim is—

1. A device of the type set forth comprising a dial and a frame therefor, a sheave on the frame, a pinion movable with the sheave, a pair of sheaves of less diameter than said first-named sheave disposed above said sheave and on opposite sides thereof, a cord passing over each of said pair of sheaves and having its intermediate portion passed under said first-named sheave, a float on one end of the cord, and a counterweight on the other end thereof, a second dial on the first-named dial, a pointer for each dial, and means operated by said pinion for actuating the pointer of the first-named dial, the pointer of the second-named dial being movable with the sheave.

2. A device of the type set forth comprising a dial and a frame therefor, a sheave on the frame, a pinion movable with the sheave, a pair of sheaves disposed on opposite sides of the first-named sheave, a second and smaller dial on the first-named dial, independent pointers for each dial, the pointer of the smaller dial being connected to and movable with the first-named sheave and the pinion thereof, a train of gears operated by said pinion for actuating the pointer of the larger dial, and a cord passing under the first-named sheave, and over each of said pair of sheaves, said cord having a float on one of its ends, and a counterweight on its other end.

Signed by us at Cleveland, Ohio, this 3d day of March, 1904.

JAMES GEDEON.
JOSEPH F. PROSSER.

Witnesses:
CHAS. E. PEGLER,
JULIA S. PEGLER.